US011992831B2

(12) United States Patent
Thevenet (10) Patent No.: US 11,992,831 B2
(45) Date of Patent: May 28, 2024

(54) METHOD FOR COMPLETELY EMPTYING A CATALYTIC REACTOR BY MEANS OF AN ARTICULATED ARM EQUIPPED WITH ROTARY SPIRAL PROTUBERANCES

(71) Applicant: EURECAT S.A., La Voulte-sur-Rhone (FR)

(72) Inventor: Vincent Thevenet, Allex (FR)

(73) Assignee: EURECAT S.A., La Voulte-sur-Rhone (FR)

(*) Notice: Subject to any disclaimer, the term of this patent is extended or adjusted under 35 U.S.C. 154(b) by 519 days.

(21) Appl. No.: 17/244,710

(22) Filed: Apr. 29, 2021

(65) Prior Publication Data

US 2021/0339213 A1 Nov. 4, 2021

(30) Foreign Application Priority Data

Apr. 30, 2020 (FR) ...................................... 2004297

(51) Int. Cl.
*B01J 8/00* (2006.01)
*B65G 65/46* (2006.01)

(52) U.S. Cl.
CPC .............. *B01J 8/002* (2013.01); *B01J 8/003* (2013.01); *B65G 65/466* (2013.01); *B01J 2208/00761* (2013.01); *B01J 2208/00769* (2013.01)

(58) Field of Classification Search
CPC .. B01J 8/002; B01J 8/003; B01J 2208/00761; B01J 2208/00769; B01J 2219/3088; B01J 8/0015; B01J 8/0045; B01J 8/02; B01J 8/008; B01J 4/00; B01J 8/0242;

(Continued)

(56) References Cited

U.S. PATENT DOCUMENTS 812,361 A 2/1906 Alfred et al.
7,959,870 B2 4/2011 Yanokuchi et al.
(Continued)

FOREIGN PATENT DOCUMENTS

CN 203741273 U * 7/2014
CN 209613717 U 11/2019
EP 3108958 A1 6/2016
(Continued)

OTHER PUBLICATIONS

Search Report for Application No. FR2004297 dated Jan. 21, 2021.

*Primary Examiner* — Huy Tram Nguyen
(74) *Attorney, Agent, or Firm* — Hahn Loeser & Parks LLP; Bret A. Hrivnak (57) ABSTRACT

The present invention includes a method for emptying a reactor containing at least one bed of spent catalyst particles and that comprises at least one dump tube, which opens into the reactor in the bottom portion of the bed of particles or underneath the latter. The method comprises the following:
a first step of causing a proportion of the catalyst bed to flow out of the reactor via said dump tube; then
a second step of expelling out of the reactor the catalyst remainder, by driving towards the opening of the dump tube the catalyst particles remaining in the reactor at the end of the first step, this step being performed by means of a removable device introduced into the reactor via the dump tube,
and is characterised in that said removable device comprises an articulated arm bearing one or more protuberances spirally disposed about a rotary axis.

18 Claims, 6 Drawing Sheets

(58) Field of Classification Search
CPC ........ B65G 65/466; B65G 47/74; B08B 5/04; B08B 9/087
USPC ........................................................ 422/219
See application file for complete search history.

(56) References Cited

U.S. PATENT DOCUMENTS

2016/0375417 A1   12/2016  Darcissac et al.
2016/0375418 A1   12/2016  Darcissac et al.

FOREIGN PATENT DOCUMENTS

| | | |
|---|---|---|
| EP | 3108959 A1 | 6/2016 |
| JP | 2013226520 A | 11/2013 |
| WO | 2004058572 A1 | 7/2004 |

* cited by examiner

FIG.1

PRIOR ART

FIG.2

PRIOR ART

FIG.3

PRIOR ART

FIG.4

PRIOR ART

METHOD FOR COMPLETELY EMPTYING A CATALYTIC REACTOR BY MEANS OF AN ARTICULATED ARM EQUIPPED WITH ROTARY SPIRAL PROTUBERANCES

CROSS-REFERENCE TO RELATED APPLICATIONS

This application claims priority to, and benefit of, French application no. 2004297, filed Apr. 30, 2020 with the Institut National de la Propriété Industrielle (the French Patent Office), which is hereby incorporated by reference.

BACKGROUND

The present invention relates to a method that makes it possible to completely empty a reactor containing spent catalyst particles.

The method according to the invention is particularly suitable for completely emptying an industrial reactor of the spent catalyst particles that it contains.

DESCRIPTION OF THE PRIOR ART

Numerous industrial methods particularly in the fields of chemistry, petrochemistry and oil refinery, use solid catalysts in the form of small-sized particles.

These catalyst particles are in general disposed in the reactor in the form of one or more superposed beds (or layers of catalysts), each deposited on a support tray.

In the course of its use in the reactor, the catalyst gradually deactivates, and its activity decreases, such that it must be withdrawn from the reactor in order to be replaced by a new active catalyst. Thus, industrial reactors must be shut down regularly in order to renew the catalyst bed or beds. This operation takes place in two stages: the emptying of the reactor so as to withdraw the spent catalyst therefrom, then its recharging with active catalyst. These two operations must be performed as effectively and quickly as possible, so as to minimise the reactor downtime, for obvious economic reasons.

Furthermore, the emptying operation must be complete, in order to completely eliminate from the reactor the entirety of the spent catalyst. Indeed, incomplete emptying would lead to allowing spent catalyst to remain in the reactor, at the expense of active catalyst, which would be particularly detrimental to the efficiency of the unit and that is, in practice, unacceptable.

Nevertheless, completely emptying an industrial reactor of the spent catalyst particles that it contains is a tricky and problematic operation, for various reasons.

Firstly, the spent catalyst particles are sticky and have a tendency to agglomerate with one another fairly strongly and the agglomerates tend to stick to the walls of the reactor, which substantially complicates their removal from the reactor.

Secondly, the spent catalyst often contains an active phase that may be reactive on contact with the air, such as for example active phases containing metal sulphides. Because of the presence of these compounds, the spent catalyst may spontaneously self-heat very suddenly and to a significant extent, or even in some cases self-ignite on contact with the air. Most corresponding catalysts are classified, according to a United Nations standard, either as self-heating, or as pyrophoric.

Handling the spent catalyst is therefore tricky and may be dangerous, and emptying the reactor is generally performed under inert atmosphere (usually nitrogen).

In order to empty a reactor containing spent catalyst particles, a plurality of techniques, described hereafter, are known in the prior art.

Gravity Flow Emptying:

This is performed by opening the lateral dump tube or tubes located at the bottom of the reactor (or at the bottom of each catalyst bed for a multi-bed reactor), so as to enable the catalyst to flow out of the reactor under the action of its weight. In the most favourable cases this makes it possible to extract 80 to 85% of the spent catalyst contained in the reactor.

However, the spent catalyst is generally sticky and may not flow well or even not flow at all particularly when agglomerations of spent catalyst have formed. In this case, it is necessary to resort to various techniques of unplugging the bed in order to set in motion the flow of catalyst particles.

In any case, even in the most favourable, at the end of the gravity flow emptying operation a quantity of spent catalyst that in general represents 15 to 20% by weight of the initial catalyst bed, and which corresponds in the best cases to the natural slope angle of this divided solid, remains in the reactor. This catalyst remainder in the reactor at the end of the gravity flow emptying of a catalyst flowing freely is commonly called "dig out". The volume of catalyst corresponding to the dig out depends on the geometry of the reactor and on the natural slope angle of the catalyst particles. In the least favourable cases however, the catalyst remainder may further form inside the reactor pillar-shaped clusters, or cavities, as disclosed hereafter.

In any case, human invention is often required to remove the catalyst remainder: an operator goes down inside the reactor and manually removes this remainder, for example with a shovel, towards the dump tube. This operation is particularly dangerous: the reactor is under nitrogen, given the self-heating nature of the spent catalyst, and fatal accidents occur regularly during these operations. Therefore, industrialists currently desire to limit, or even completely eliminate, such human interventions inside reactors.

Suck-Out Emptying:

In general, this is performed from the top of the reactor. The top of the reactor is opened, under nitrogen sweep, the charge distribution tray generally present above the bed is disassembled, and the catalytic bed is sucked out by means of an industrial extractor with nitrogen compensation.

The head of the extractor is generally guided by an operator in order to empty the catalyst layer by layer. Solid and gas are separated via a cyclone. This widely used technique has various disadvantages: high cost; deterioration of the catalyst particles, sometimes going so far as to not make it possible to regenerate the latter for later use; the presence of an operator in the reactor, at least for the finishing operations, which generates safety problems such as described above.

Examples of this type of technique are described in documents U.S. Pat. No. 7,959,870 and WO 2004/058572.

Wet Gravity Emptying:

This technique, somewhat experimental and less commonly used, makes it possible to prevent any human intervention in the reactor under inert atmosphere. It consists in filling the reactor with water and in emptying the catalyst/water mixture via the lateral dump tubes located at the bottom of the reactor.

Nevertheless, it has major disadvantages: it generates a great deal of dirty water, and compromises the possibility of subsequently regenerating the spent catalyst in view of its reuse.

Therefore, for a long time there has been a significant need to have innovative solutions that make it possible to empty completely, rapidly, effectively and safely, the industrial reactors of the spent catalyst particles that they contain.

In application EP 3 108 959, the Applicant proposed a method for emptying a reactor comprising a dump tube in its bottom portion. This method comprises two steps: a first step of flowing under gravity of a proportion of the catalyst bed out of the reactor via the dump tube, then a second step of extracting the spent catalyst particles remaining in the reactor at the end of the first step by means of a flexible and moveable extraction sleeve, provided on its outer surface with protuberances, introduced into the reactor via the dump tube.

Application EP 3 108 958, also in the name of the Applicant, describes an alternative method, wherein the second step is performed by expelling the catalyst remainder out of the reactor using a removable device comprising at least one rotary brush fixed to the end of an articulated arm introduced into the reactor via the dump tube.

Nevertheless, these two methods, although very effective, are not entirely satisfactory, in particular in the cases where the spent catalyst does not flow freely during the first step of gravity flow emptying. Indeed, in the case where the spent catalyst particles tend to stick and to agglomerate with one another, the catalyst remainder is not in the form of a homogeneous volume having the form of a dig out, but has excrescences and/or cavities. For example, the formation of pillars and/or caverns is observed in the volume of residual catalyst at the end of the first step, which may substantially complicate the implementation of the technologies described above.

Figure 1:
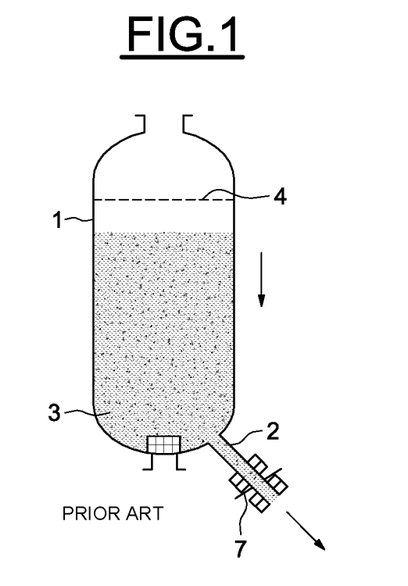
FIG. 1 illustrates a gravity flow emptying step in an industrial reactor containing a bed of spent catalyst particles, corresponding to the first step of the method according to the invention.
Figure 2:
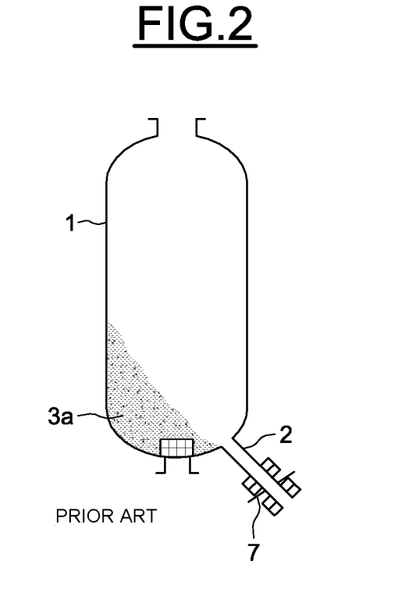
FIG. 2 presents a first configuration of the volume of residual catalyst at the end of the gravity flow emptying step of FIG. 1, in the case where the catalyst flows freely ("dig out" of conventional form).
Figure 3:
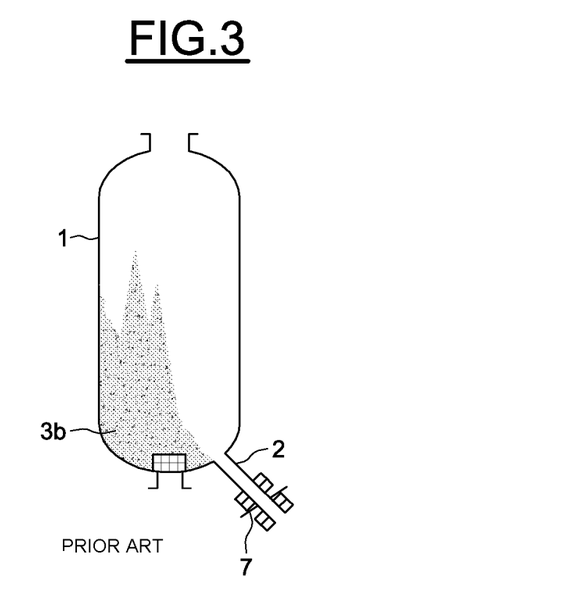
FIG. 3 presents a second configuration of the volume of residual catalyst at the end of the gravity flow emptying step of FIG. 1, when the catalyst does not flow freely by gravity, and when the volume of residual catalyst has pillar-shaped excrescences.
Figure 4:
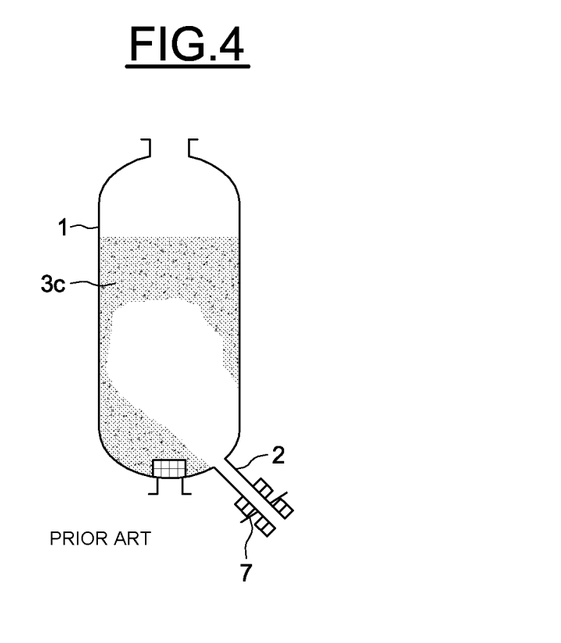
FIG. 4 presents a third configuration of the volume of residual catalyst at the end of the gravity flow emptying step of FIG. 1, when the catalyst does not flow freely by gravity, and when the volume of residual catalyst has cavities.

FIG. 1 appended illustrates a gravity flow emptying step in an industrial reactor containing a bed of spent catalyst particles. FIGS. 2 to 4 appended present three configurations of the volume of residual catalyst at the end of this gravity flow emptying step.

FIG. 1 shows an industrial reactor 1 in column form, containing a bed 3 of spent catalyst particles. The reactor 1 comprises a dump tube 2 inclined downwards, with an angle of inclination in relation to the vertical of approximately 45 degrees. The tube 2 opens into the reactor 1 in the bottom portion of the bed 3 of particles.

In order to make it possible to implement the gravity flow emptying, the dump tube 2 has been opened by opening the dump valve 7, such that the catalyst particles flow out of the reactor 1 by gravity flow, via the tube 2.

The dotted lines 4 show the initial upper level of the catalyst bed 3 before the triggering of the gravity flow, and the arrows in FIG. 1 show the direction of flow of the catalyst.

FIG. 2 illustrates the reactor 1 at the end of this gravity flow emptying step, in the case where the catalyst flows freely. This figure shows that at the end of this step a volume 3$a$ of spent catalyst that represents here approximately 15% by weight of the initial catalyst bed, which corresponds to the natural slope angle of the cluster of catalyst particles, and which cannot be eliminated by simple gravity flow emptying, remains in the reactor 1. The volume of residual catalyst 3$a$ is homogeneous and corresponds to the "dig out" of conventional form.

As illustrated in FIG. 3, when the catalyst does not flow freely by gravity, the volume of residual catalyst 3$b$ may have excrescences formed by catalyst agglomerations. FIG. 3 shows pillar-shaped excrescences, which is a typical shape, but excrescences of all shapes and dimensions may in practice be observed.

FIG. 4 illustrates another configuration likely to be obtained also in the case where the catalyst does not flow freely by gravity. In this figure, the volume of residual catalyst 3$c$ has cavities or caverns, which form in the mass of the catalyst due to the agglomeration of catalyst particles with one another and to their adhesion to the wall of the reactor.

The technologies proposed in the prior art do not always make it possible to satisfactorily treat the cases where the volume of residual catalyst has excrescences and/or cavities, such as those illustrated in FIGS. 3 and 4.

In particular, the removable devices such as those proposed in EP 3 108 958 and EP 3 108 959 do not always make it possible to break the catalyst agglomerations and to overcome excrescences such as the pillars.

In addition, when the removable device effectively makes it possible to break excrescences and/or eliminate cavities in the mass of the catalyst, clusters of catalyst particles detach and fall on the device, and may totally or partially bury it and thus block its operation, or even damage it. In this case, it then in general becomes necessary to resort to human intervention inside the reactor in order to clear and unblock said device, and repair it if applicable.

The Applicant has now discovered a new technique for emptying reactors containing spent catalyst particles, which makes it possible to remedy the above-described disadvantages.

The present invention is therefore an improvement of prior technologies, which makes it possible to empty very effectively a reactor of its entire load of spent catalyst, including in the case where the catalyst particles stick and agglomerate with one another.

SUMMARY OF THE INVENTION

The aim of the present invention is a method for emptying a reactor containing at least one bed of spent catalyst particles and that comprises at least one dump tube, which opens into the reactor in the bottom portion of said bed of particles or underneath the latter. The method comprises the following successive steps:

a first step of causing a proportion of the catalyst bed to flow out of the reactor via said dump tube; then a second step of expelling the catalyst remainder out of the reactor, by driving towards the opening of the dump tube the catalyst particles remaining in the reactor at the end of the first step, this step being performed by means of a removable device introduced into the reactor via the dump tube.

This method is characterised in that said removable device comprises an articulated arm bearing one or more protuberances spirally disposed about a rotary axis.

The method according to the invention makes it possible to empty in a particularly complete, effective and rapid manner the reactor of its load of spent catalyst, including in the case where the latter agglomerate with one another.

The method according to the invention comprises a first emptying step similar to those described in the prior art, but has the advantage of making it possible in the course of its second step to achieve complete emptying of the reactor regardless of the configuration of the volume of residual catalyst at the end of the first step, that is to say that this volume of residual catalyst is homogeneous in the form of a conventional dig out (3a), or not. The method according to the invention remains totally effective including in the cases where the volume of residual catalyst has excrescences (3b) and/or cavities (3c) such as described above.

In particular, the articulated arm bearing one or more protuberances spirally disposed about a rotary axis (also designated hereafter by "rotary spiral protuberances") makes it possible to reach the areas of agglomerated catalyst regardless of their configurations, and to break these agglomerations.

Catalyst clusters falling on the rotary spiral protuberances does not prevent the latter from continuing their rotational movements, and the spiral shape of the protuberances makes it possible to remove the catalyst clusters and to clear the rotary portion. Thus, the device according to the invention may continue to operate and to remove the catalyst particles including when it is buried in the mass of the catalyst.

The method according to the invention thus makes it possible to prevent any human intervention inside the reactor, and to improve the safety of the operations for unloading the spent catalyst.

Finally, the method according to the invention makes it possible to preserve the properties of the spent catalyst, and to limit its damage during its unloading, which is essential when the catalyst must subsequently be regenerated in view of later use.

Other aims, features, aspects and advantages of the invention will become more apparent upon reading the following description and by referring to the figures appended and described hereafter.

In the following, and at least one other indication, the limits of a value range are included within this range, particularly in the expressions "between" and "ranging from . . . to . . . ". Moreover, the expressions "at least one" and "at least" used in the present description are respectively equivalent to the expressions "one or more" and "more than or equal to".

DETAILED DESCRIPTION

The first step of the method according to the invention consists in causing a proportion of the catalyst bed to flow out of the reactor through the dump tube, by opening it.

This first step is preferably performed under gravity, that is to say by causing a proportion of the catalyst bed to flow under gravity out of the reactor via said dump tube.

"Flow under gravity" means that the catalyst flows from the reactor in the course of the first step under the action of its own weight, and is neither pushed by mechanical pushing means inside the reactor (for example, by an operator), nor sucked out of the reactor by means for extracting particles.

This is typically a conventional gravity flow, such as those described in the prior art. The first step is typically illustrated in FIG. 1 such as described above.

The flow may also be assisted, that is to say that in the course of the first step means may be implemented for facilitating the removal of the catalyst out of the reactor, for example by means of injecting pressurised gas into the reactor.

Moreover, particularly in the case where the catalyst flow does not occur spontaneously during the opening of the dump tube, it is possible, immediately before the first step, to resort to means for deagglomerating the catalyst bed. Such means are known in the prior art. In particular, this may concern an injection of pressurised gas (typically pressurised $CO_2$). These means make it possible to start the flow of catalyst particles, after which the catalyst, in the case of a gravity flow, is allowed to flow under the sole action of its weight.

Thus, according to one embodiment of the invention, said first step is preceded by a preliminary step of deagglomerating the catalyst, which is preferably achieved by injecting a pressurised gas such as carbon dioxide or nitrogen into the catalyst bed.

The present invention applies to reactors that are provided with at least one dump tube, which opens into the reactor in the bottom portion of the bed of particles or underneath the latter.

The dump tube may be horizontal, or inclined downwards. Preferably, it is inclined downwards. In this case, the dump tube preferably has an angle of inclination in relation to the vertical ranging from 0 to 90 degrees, more preferably 20 to 70 degrees.

In the course of the first step of the method according to the invention a generally substantial proportion of the bed of spent catalyst is extracted from the reactor, typically more than 30% by weight of the initial bed, and in general ranging from 50 to 95% by weight of the initial catalyst bed, more particularly from 60 to 90% by weight of the initial catalyst bed.

The catalyst remainder is subsequently completely eliminated from the reactor by means of the second step of the method of the invention.

This second step implements a removable device comprising an articulated arm bearing one or more protuberances spirally disposed about a rotary axis, also referred to as rotary spiral protuberances. Advantageously, the rotary spiral protuberance or protuberances are disposed at the end of the articulated arm, which is introduced into the reactor.

When the axis is set in rotation, the spiral protuberance or protuberances scrape the catalyst clusters and thus ensure the detachment of the catalyst particles and their expulsion towards the opening of the dump tube.

Thus, in the course of this second step the remainder of spent catalyst is totally expelled from the reactor via the dump tube.

The protuberance or protuberances may be of variable shapes and dimensions in the same device. Similarly, the diameter and the pitch of the spiral or spirals may also vary in the same device.

The rotary axis about which the spiral protuberance or protuberances are disposed may be materialised or not.

According to a first variant, the rotary axis is not materialised, that is to say that it does not consist of a materially visible element such as for example a part of the device. In this case, the spiral protuberance or protuberances wind about a fictive axis (in as much as it is not materially visible), and may for example have a shape similar to that of a corkscrew or of a spring.

According to a second variant, the rotary axis is materialised, that is to say visible in the device. In this case, it may be reduced to a single line about which the spiral protuberance or protuberances wind, or consist of a rod of more or less significant diameter, about which are disposed the spiral protuberance or protuberances.

According to a preferred embodiment corresponding to this second variant, the articulated arm comprises at its end a rotary rod about which are disposed the spiral-shaped protuberance or protuberances.

"Rod" designates in a manner known per se a cylindrical element. According to the invention, the rod is rotary, that is to say it rotates about its longitudinal axis.

The rod bears spiral-shaped protuberances, that is to say that its shape is, over all or part of its length, similar to that of a threaded rod.

According to a particularly preferred embodiment, said rotary rod bearing the spiral-shaped protuberance or protuberances has along all or part(s) of its length the shape of an auger.

When the rod bears a plurality of protuberances, these may be joined to one another or spaced along the rod.

The spiral formed by the winding of a plurality of protuberances may be of continuous or discontinuous shape.

The protuberance or protuberances as well as the rod if applicable may consist of any suitable rigid material, such as for example and in a non-limiting manner, rigid polymeric materials, metal materials (for example steel), composites and mixtures of such materials. The protuberances may be made of the same material as the rod, for example obtained by threading of a conventional rod, or not.

The shapes and dimensions of the protuberances, as well as those of the rod if applicable (particularly diameter, length), depend on the dimensions of the catalyst bed present in the reactor to be emptied as well as on the type of catalyst particles and on their more or less agglomerated state.

According to the present invention, the protuberance or protuberances spirally disposed about a rotary axis are present on an articulated arm, preferably at the end thereof. This articulated arm is introduced into the reactor via the dump tube, which makes it possible to move said rotary spiral protuberances in all possible directions inside the reactor, position them on the catalyst clusters, and if applicable adjust their position by varying the angle between the rotary axis and the rest of the articulated arm.

Thus, the articulated arm makes it possible to introduce into and move inside the reactor the rotary spiral protuberances, and to place them in contact with the residual catalyst in order to detach it and remove it.

According to an advantageous embodiment, the articulated arm used in the invention is telescopic, and particularly consists of a plurality of modules that are assembled, for example by interlocking, just before the implementation of the method.

The device according to the invention is removable, and transportable. For the implementation of the second step, the articulated arm is advantageously fixed on the dump tube.

The movements and the positioning of the rotary spiral protuberances inside the reactor may be controlled by means of guidance of the articulated arm. Means of guidance is understood to be any means making it possible to move and position the articulated arm; suitable means of guidance may for example consist of a set of motors.

These means of guidance may be controlled manually, automatically or semi-automatically.

If applicable, the angle of the articulation between the rotary spiral protuberances and the rest of the articulated arm may be controlled, or left free.

When the control of the means of guidance of the articulated arm is manual, an operator outside of the reactor controls the movements of the articulated arm inside the reactor by actuating these means of guidance.

When the control of the means of guidance of the articulated arm is automatic, the means of guidance are controlled by a computer that runs a program for moving the articulated arm inside the reactor. The movement program may be predefined, that is to say that the movements of the articulated arm in the course of the second step have been calculated beforehand, so as to optimise the removal of the catalyst remainder. The movement program may also be designed so as to organise a random movement of the articulated arm inside the reactor.

The control of the means of guidance of the articulated arm may also be semi-automatic, that is to say controlled in part via a computer program, and in part by an operator.

Similarly, the speed of rotation of the spiral protuberances may be controlled by means of a motor, manually, automatically or semi-automatically as described above.

Furthermore, according to a particularly advantageous embodiment of the invention, means for detecting the position of the rotary spiral protuberance or protuberances are present in the reactor. Such means make it possible to know at any moment the exact position of said protuberances in the reactor, and if applicable, to optimise their movements and their speed of rotation.

These detection means may comprise computation software, which gradually determines the position of the rotary spiral protuberances in the reactor given the movements of the articulated arm (simulation of the position of the rotary spiral protuberances via software compiling the control data in order to deduce the position).

Other detection means include for example radar or ultrasound detection systems; systems implementing one or more accelerometers, one or more GPS; viewing systems by one or more cameras.

According to a preferred embodiment, said detection means comprise one or more camera(s), which make it possible to view at any moment the position of the rotary spiral protuberances in the reactor. Such a camera may for example be positioned on the inner wall of the reactor and/or on the articulated arm. Various types of cameras may be used for this purpose, particularly including night vision cameras, infrared cameras.

Such a camera may further make it possible if necessary to locate the catalyst remainders, and consequently to control the movements and the speed of rotation of the rotary spiral protuberances.

The speed of rotation of the rotary spiral protuberance or protuberances may be fixed or variable. Preferably, it is variable, which makes it possible to vary it as the second step advances. The speed of rotation may also be adjusted given the size and the configuration of the catalyst agglomerations.

Figure 5:
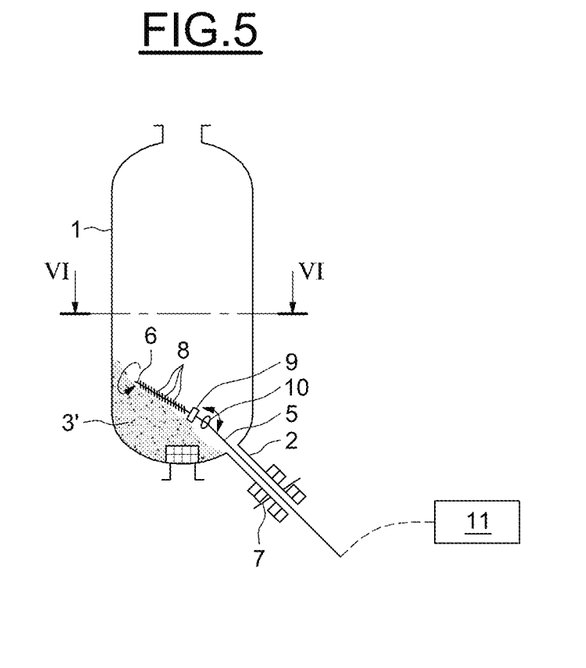
FIG. 5 illustrates the implementation of the second step of the method according to the invention.
Figure 6:
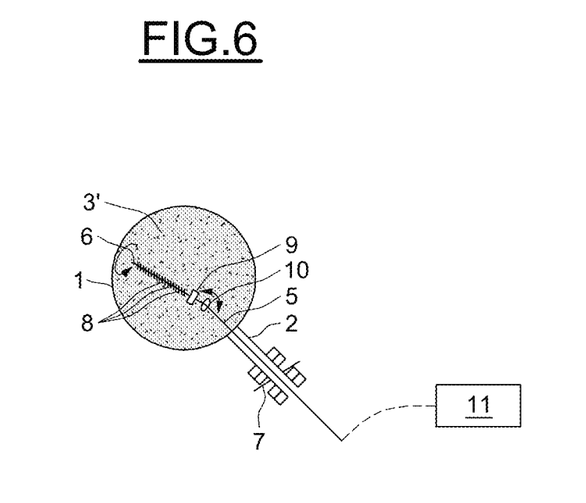
FIG. 6 is a sectional view of FIG. 5, in transverse section according to the sectional plane VI.

FIGS. 5 and 6 illustrate the implementation of the second step of the method according to the invention: the catalyst remainder 3' is expelled out of the reactor 1 by means of a removable device comprising an articulated arm consisting of a first branch 5 connected by an articulation 10 to a rod 6 about which spiral-shaped protuberances 8 are disposed.

The rod 6 is rotated about its axis by a motor 9. On the embodiments of FIGS. 5 and 6, this motor is directly supported by the rod 6, but it may perfectly be positioned in another place, for example transferred on other elements of the device.

The whole of this device is introduced into the reactor 1 via the dump tube 2.

The branch 5 makes it possible to introduce the rotary rod 6 equipped with spiral protuberances more or less deeply into the reactor, and the articulation 10 makes it possible to move the rotary rod 6 in all possible directions inside the reactor 1.

According to one embodiment not shown, the branch 5 itself may be articulated.

The movements of the branch 5 are ensured by means of the control unit 11 positioned outside of the reactor 1, which makes it possible to control the movements of the device in the reactor 1 manually, automatically or semi-automatically.

The control unit 11 is connected to the branch 5 by energy and information transmission elements (such as for example hydraulic hoses, electrical cables etc.). It may comprise a means of guidance of various types, for example motorised, or preferably manual. It may also make it possible to provide the energy necessary for ensuring the movements of the device and powering the motor 9. These means of guidance may also make it possible to control the articulation 10 so as to control the angles of inclination of the rotary rod 6 in relation to the branch 5. Alternatively, the articulation 10 may be left free.

FIGS. 7 to 12 illustrate various embodiments of spiral-shaped protuberances 8.

Figure 7:
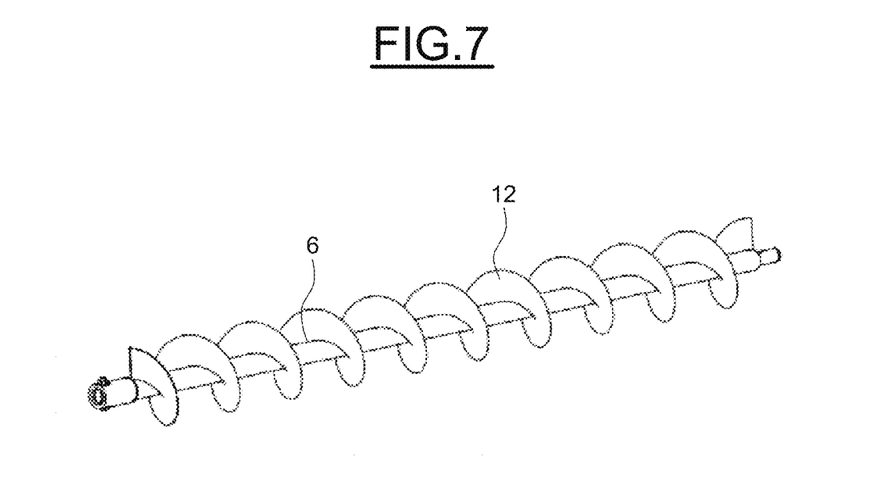
FIG. 7 shows a single continuous spiral protuberance winding about a rotary rod.

FIG. 7 illustrates one embodiment wherein the rotary rod 6 bears a single protuberance 12 having the shape of a continuous spiral. This figure corresponds to a particularly preferred embodiment, wherein the rotary rod has the shape of an auger.

Figure 8:
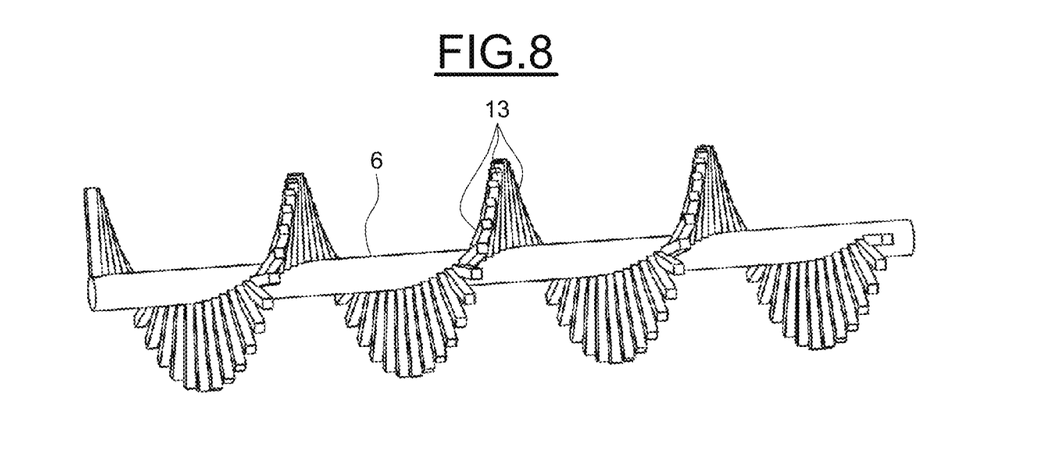
FIG. 8 shows a plurality of spiral protuberances winding continuously about a rotary rod.

FIG. 8 illustrates a variant of FIG. 7, wherein the rotary rod 6 bears a plurality of protuberances 13 joined to one another, winding continuously, so as to form a continuous spiral about the axis 6.

Figure 9:
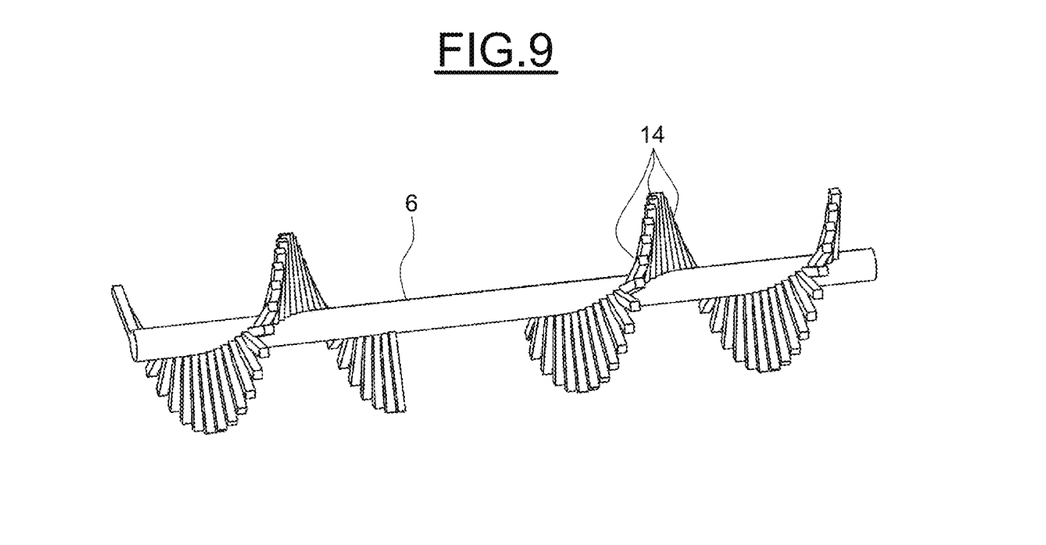
FIG. 9 shows a plurality of spiral protuberances winding discontinuously about a rotary rod.

FIG. 9 illustrates a variant of FIG. 8, wherein the protuberances 14 wind discontinuously, so as to form a discontinuous spiral about the axis 6.

Figure 10:
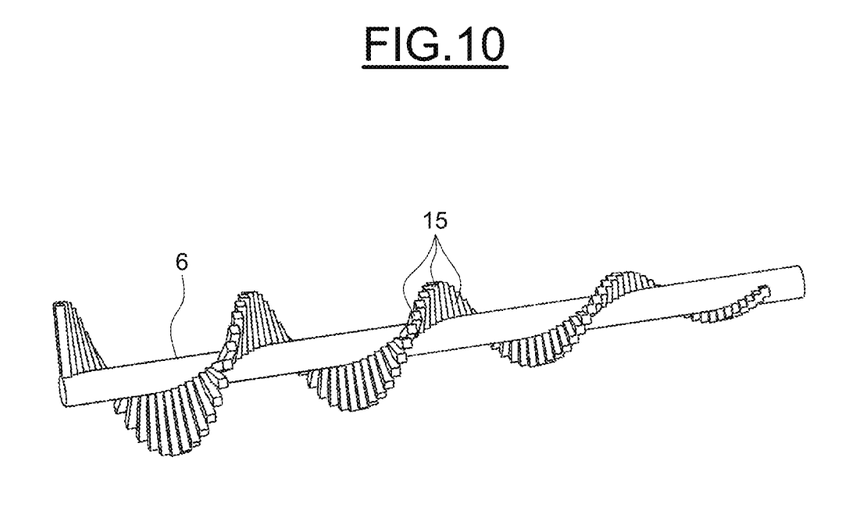
FIG. 10 shows a plurality of spiral protuberances of variable dimensions, winding continuously about a rotary rod.

FIG. 10 illustrates another variant of FIG. 8, wherein the protuberances 15 are of variable dimensions.

Figure 11:
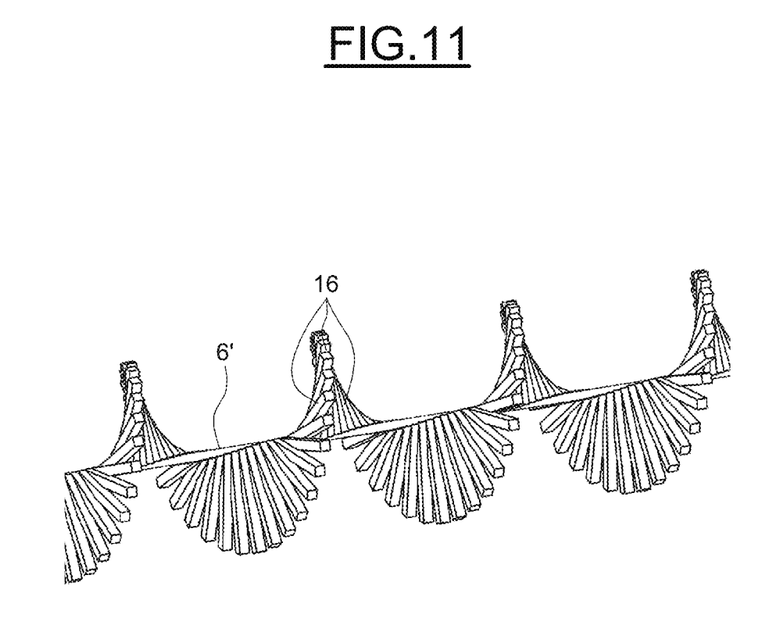
FIG. 11 shows a plurality of spiral protuberances winding continuously about a visible rotary axis.

FIG. 11 illustrates one embodiment wherein the protuberances 16 joined to one another, wind continuously about an axis 6' that is visible but reduced to a line.

Figure 12:
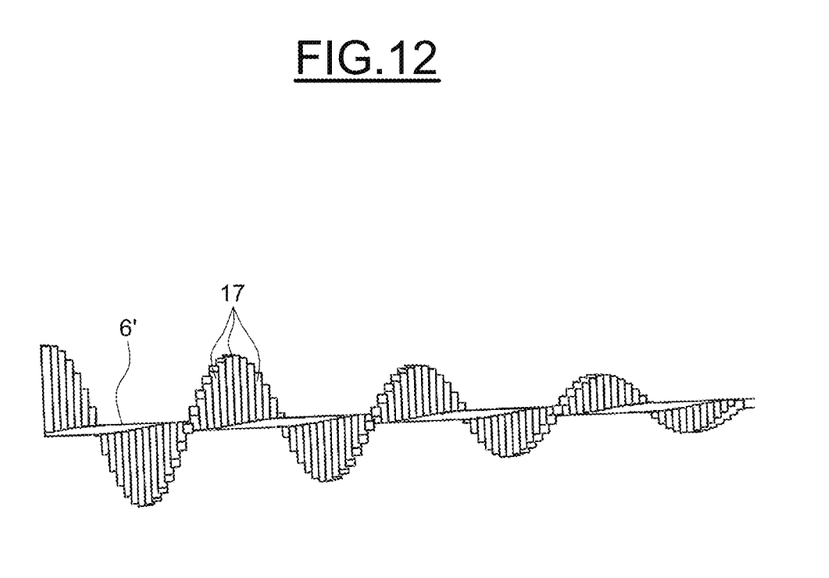
FIG. 12 shows a plurality of spiral protuberances of variable dimensions, winding continuously about a visible rotary axis.

FIG. 12 illustrates a variant of FIG. 11, wherein the protuberances 17 are of variable dimensions.

Figure 13:
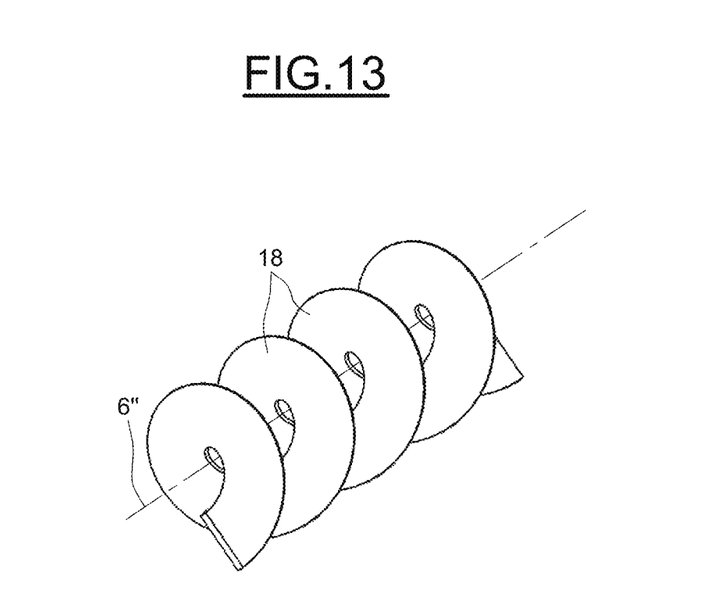
FIG. 13 shows a single spiral protuberance winding about an axis of rotation that is not materialised.

FIG. 13 illustrates another embodiment wherein a single protuberance 18 having a continuous spiral shape winds about an axis 6" that is not materialised, and has a shape similar to that of a corkscrew or of a spring.

In the case where the reactor comprises a plurality of catalyst beds, each bed may be emptied by means of the method according to the invention. This requires the presence on the reactor of at least one dump tube at the bottom of each catalyst bed.

When the spent catalyst to be withdrawn from the reactor is reactive to the air, for example when it possesses a self-heating nature, the method according to the present invention is typically performed by placing then by keeping the reactor under inert gas, that is to say the catalyst that is withdrawn from the reactor during the two steps according to the invention is gradually replaced by an inert gas, such as for example nitrogen. This introduction of inert gas into the reactor as the reactor is emptied, may be performed for example from the top or from the bottom of the reactor.

What is claimed is:

1. Method for emptying a reactor containing at least one bed of spent catalyst particles and that comprises at least one dump tube, which opens into the reactor in the bottom portion of said bed of particles or underneath the latter, the method comprising the following successive steps:
    a first step of causing a proportion of the catalyst bed to flow out of the reactor via said dump tube; then
    a second step of expelling out of the reactor the catalyst remainder by driving towards the opening of the dump tube the catalyst particles remaining in the reactor at the end of the first step, this step being performed by means of a removable device introduced into the reactor via the dump tube,
    characterised in that said removable device comprises an articulated arm bearing one or more protuberances spirally disposed about a rotary axis.

2. The method according to claim 1, characterised in that the first step is performed under gravity, by causing a proportion of the catalyst bed to flow under gravity out of the reactor via said dump tube.

3. The method according to claim 1, characterised in that the protuberance or protuberances spirally disposed about the rotary axis are present at the end of the articulated arm.

4. The method according to claim 1, characterised in that the rotary axis is materialised.

5. The method according to claim 4, characterised in that the articulated arm comprises at its end a rotary rod about which are disposed the spiral-shaped protuberance or protuberances.

6. The method according to claim 5, characterised in that said rotary rod bearing the spiral-shaped protuberance or protuberances has along all or part(s) of its length the shape of an auger.

7. The method according to claim 4, characterised in that the rod bears a plurality of protuberances joined to one another or spaced along the rod.

8. The method according to claim 1, characterised in that the device comprises a plurality of protuberances, of which the winding forms a spiral of continuous or discontinuous shape.

9. The method according to claim 1, characterised in that the rotary axis is not materialised, the protuberance or protuberances having a shape similar to that of a corkscrew or of a spring.

10. The method according to claim 1, characterised in that in the course of the second step the movements and the positioning of the rotary spiral protuberances inside the reactor are controlled by means of guidance of the articulated arm, controlled manually, automatically or semi-automatically.

11. The method according to claim 1, characterised in that the articulated arm is telescopic, and particularly consists of a plurality of modules that are assembled just before the implementation of the method.

12. The method according to claim 1, characterised in that means for detecting the position of said protuberance or protuberances are present in the reactor.

13. The method according to claim 12, characterised in that said means for detecting the position of said protuberance or protuberances comprise one or more camera(s), positioned on the inner wall of the reactor and/or on the articulated arm.

14. The method according to claim 1, characterised in that the dump tube is horizontal or inclined downwards, with an angle of inclination in relation to the vertical ranging from 0 to 90 degrees.

15. The method according to claim 1, characterised in that said first step is preceded by a preliminary step of deagglomerating the catalyst, achieved by injecting a pressurised inert gas such as carbon dioxide or nitrogen into the catalyst bed.

16. The method according to claim 2, characterised in that the rotary axis is not materialised, the protuberance or protuberances having a shape similar to that of a corkscrew or of a spring.

17. The method according to claim 3, characterised in that the rotary axis is not materialised, the protuberance or protuberances having a shape similar to that of a corkscrew or of a spring.

18. The method according to claim 14, characterised in that the dump tube is inclined downwards with the angle of inclination in relation to the vertical ranging from 20 to 70 degrees.

* * * * *